United States Patent
Panda et al.

(10) Patent No.: US 8,958,661 B2
(45) Date of Patent: Feb. 17, 2015

(54) LEARNING CONCEPT TEMPLATES FROM WEB IMAGES TO QUERY PERSONAL IMAGE DATABASES

(75) Inventors: Navneet Panda, Goleta, CA (US); Yi Wu, San Jose, CA (US); Jean-Yves Bouguet, Belmont, CA (US); Ara Nefian, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1369 days.

(21) Appl. No.: 11/731,762

(22) Filed: Mar. 30, 2007

(65) Prior Publication Data

US 2008/0240575 A1 Oct. 2, 2008

(51) Int. Cl.

| G06K 9/56 | (2006.01) |
| G06K 9/54 | (2006.01) |
| G06K 9/60 | (2006.01) |
| G06K 9/64 | (2006.01) |
| G06K 9/68 | (2006.01) |
| G06K 9/32 | (2006.01) |
| G06F 7/00 | (2006.01) |
| G06F 17/30 | (2006.01) |
| G06K 9/62 | (2006.01) |

(52) U.S. Cl.
CPC ........ *G06K 9/6255* (2013.01); *G06F 17/30277* (2013.01); *Y10S 707/915* (2013.01); *Y10S 707/99936* (2013.01)
USPC ........... 382/305; 382/205; 382/217; 382/299; 707/E17.025; 707/915; 707/999.006; 707/771

(58) Field of Classification Search
USPC ......... 382/100, 115, 128, 162, 181, 190, 195, 382/209, 217–219, 224–225, 305
See application file for complete search history.

(56) References Cited

U.S. PATENT DOCUMENTS

| 6,751,363 | B1 * | 6/2004 | Natsev et al. ................. 382/305 |
| 8,204,842 | B1 * | 6/2012 | Zhang et al. ..................... 706/45 |
| 2002/0087577 | A1 * | 7/2002 | Manjunath et al. ........ 707/104.1 |
| 2002/0178135 | A1 * | 11/2002 | Tanaka .............................. 707/1 |
| 2006/0143176 | A1 * | 6/2006 | Mojsilovic et al. ............... 707/6 |
| 2008/0177640 | A1 * | 7/2008 | Gokturk et al. ................. 705/27 |

OTHER PUBLICATIONS

Georgescu, B.; Shimshoni, I.; Meer, P.;, "Mean shift based clustering in high dimensions: a texture classification example," Computer Vision, 2003. Proceedings. Ninth IEEE International Conference on , vol., No., pp. 456-463 vol. 1, Oct. 13-16, 2003.*
Zhang, Yu-Jin, ed. Semantic-based visual information retrieval. IGI Global, Dec. 2007.*
Mittal, A. (2006). An Overview of Multimedia Content-Based Retrieval Strategies. Informatica (03505596), 30(3), 347-356.*

(Continued)

*Primary Examiner* — Randolph I Chu
*Assistant Examiner* — Nathan Bloom
(74) *Attorney, Agent, or Firm* — Caven & Aghevli LLC

(57) ABSTRACT

Methods and apparatus to generate templates from web images for searching an image database are described. In one embodiment, one or more retrieved images (e.g., from the Web) may be used to generate one or more templates. The templates may be used to search an image database based on features commonly shared between sub-images of the retrieved images. Other embodiments are also described.

22 Claims, 3 Drawing Sheets

(56) References Cited

OTHER PUBLICATIONS

Liu, Ying, et al. "A survey of content-based image retrieval with high-level semantics." Pattern Recognition 40.1 (Jan. 2007): 262-282.*

Bouguet, Jean-Yves, et al., "Methods and Apparatus for Retrieving Images From a Large Collection of Images", U.S. Appl. No. 11/604,114, filed Nov. 22, 2006.

Kosinov, Serge, et al., "Method for Personalized Named Entity Recognition", U.S. Appl. No. 11/508,579, filed Aug. 22 2006.

Park et al., "OCR in a Hierarchical Feature Space", IEEE Transactions on Pattern Analysis and Machine Intelligence, vol. 22, No. 4, Apr. 2000, pp. 400-407.

Albuz et al., "Quantized CIELab* Space and Encoded Spatial Structure for Scalable Indexing of Large Color Image Archives", Proceeding of the IEEE International. Conference on Acoustics, Speech, and Signal Processing (ICASSP), vol. 4, 2000, pp. 1995-1998.

Lim et al., "Home Photo Content Modeling for Personalized Event-Based Retrieval", Published by the IEEE Computer Society, Oct.-Dec. 2003, pp. 28-37.

Natale et al., "Structure-Based Image Retrieval Using a Structured Color Descriptor", DICA—University of Trento, 2001, 7 pages.

Huston et al., "SnapFind: Brute Force Interactive Image Retrieval", EECS, University of Michigan, Dec. 18-20, 2004, 6 pages.

Malki et al., "Region Queries without Segmentation for Image Retrieval by Content", INRIA/Rocquencourt, France, 1999, 8 pages.

Manouvrier et al., "A generalized metric distance between hierarchically partitioned images", MDM/KDD'05, Chicago, IL, USA, Aug. 21, 2005, 9 pages.

Luo et al., "Content Based Sub-Image Retrieval via Hierarchical Tree Matching", MMDB'03, New Orleans, Louisiana, USA., Nov. 7, 2003, pp. 63-69.

Sebe et al., "Multi-Scale Sub-Image Search", ACM Multimedia '99 (Part 2), Orlando, FL, USA, Oct. 1999, pp. 79-82.

Ke et al., "Efficient Near-duplicate Detection and Sub-image Retrieval", MM'04, New York, USA, Oct. 10-16, 2004, pp. 869-876.

Remias et al., "Supporting Content-Based Retrieval in Large Image Database Systems", Kluwer Academic Publishers, Boston, 1997, pp. 1-23.

Rui et al., "Image Retrieval: Current Techniques, promising Directions and Open Issues", 1999, 17 pages.

Ben-Haim et al., "Improving Web-based Image Search via Content Based Clustering", Department of Computer Science and Engineering, University of California, San Diego, Jun. 17-22, 2006, 6 pages.

Wang et al., "Simplicity: Semantics-sensitive Integrated Matching for Picture Libraries", 2001, 12 pages.

\* cited by examiner

LEARNING CONCEPT TEMPLATES FROM WEB IMAGES TO QUERY PERSONAL IMAGE DATABASES

BACKGROUND

The present disclosure generally relates to the field of computing. More particularly, an embodiment of the invention generally relates to techniques for learning concept templates from web images to query person image databases.

A computer may be used to store images that have been converted into digital format. Unlike other types of computer files that may include textual data, image files may include no text or very little text associated with the images such as the image creation date or a file name, for example. Hence, searching for specific image files may not be as easy as searching for text files stored on a computer. Information to annotate image files may be entered manually, but this process may be too time-consuming and burdensome for users.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Some of the embodiments discussed herein may be used to facilitate more efficient and/or quicker searching of image files stored in an image database. In an embodiment, some of the techniques discussed herein may be used to generate one or more concept templates based on images obtained through the World Wide Web (which may also be referred to interchangeably herein as the "Internet" or the "Web"). Moreover, the templates may be used to search an image database such as a personal image database stored on a personal computer or a server.

Figure 1:
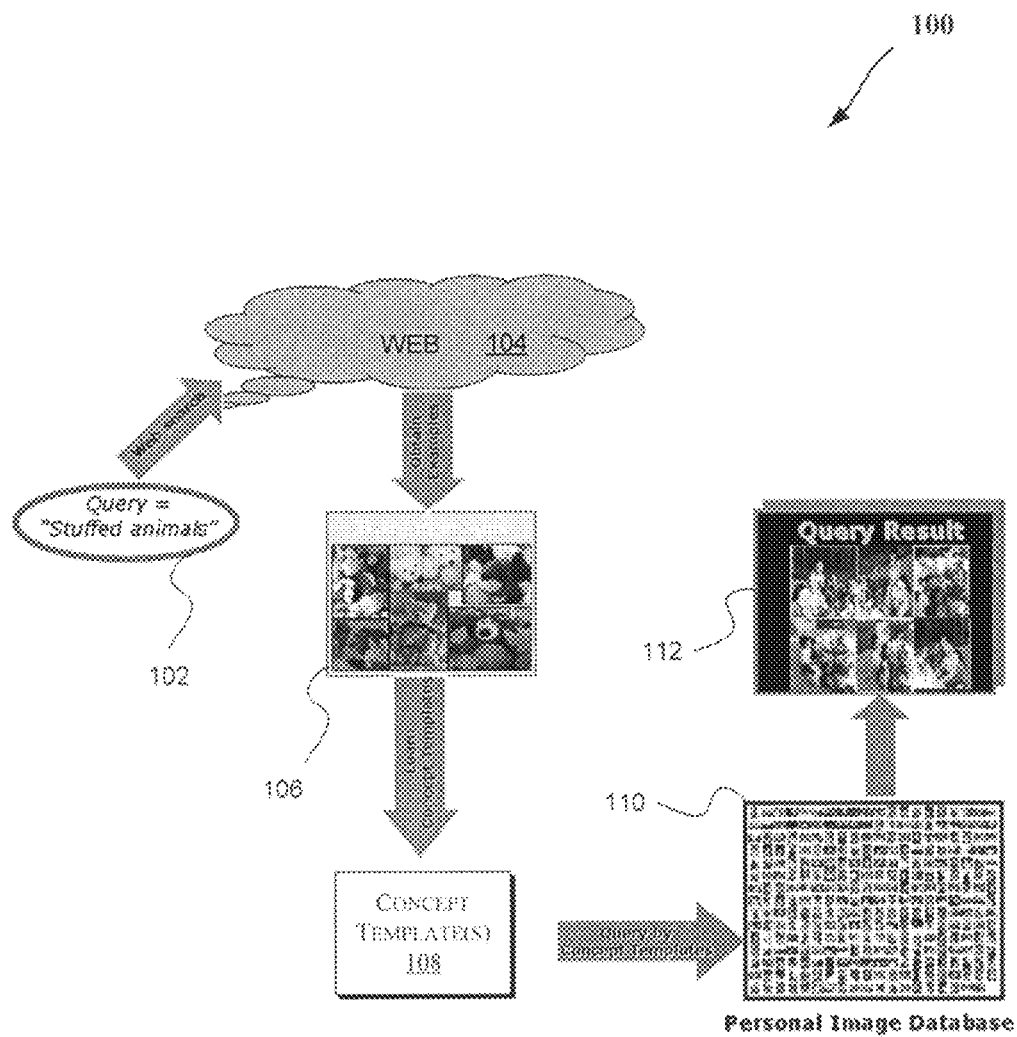
FIGS. 1 and 2 illustrate flow diagram of methods, according to some embodiments of the invention.

More particularly, FIG. 1 illustrates a block diagram of an embodiment of the method 100 to search a target image database. In an embodiment, various components discussed herein, e.g., with reference to FIGS. 2 and 3 may be utilized to perform one or more of the operations discussed with reference to FIG. 1. As shown in FIG. 1, a query 102 (e.g., which may be initiated by the user) may cause a search to be performed through the Web 104 (e.g., for images that may correspond to a search key "stuffed animals"). The result of the search may provide one or more training images 106. The training images 106 may be used to generate one or more concept templates 108. The concept templates 108 may be used to search a personal image database 110. For example, the concept templates 108 may identify features that are commonly shared by images that include stuffed animals. The search results may then be displayed 112, e.g. to a user via a display device such as display device 316 of FIG. 3.

Figure 2:
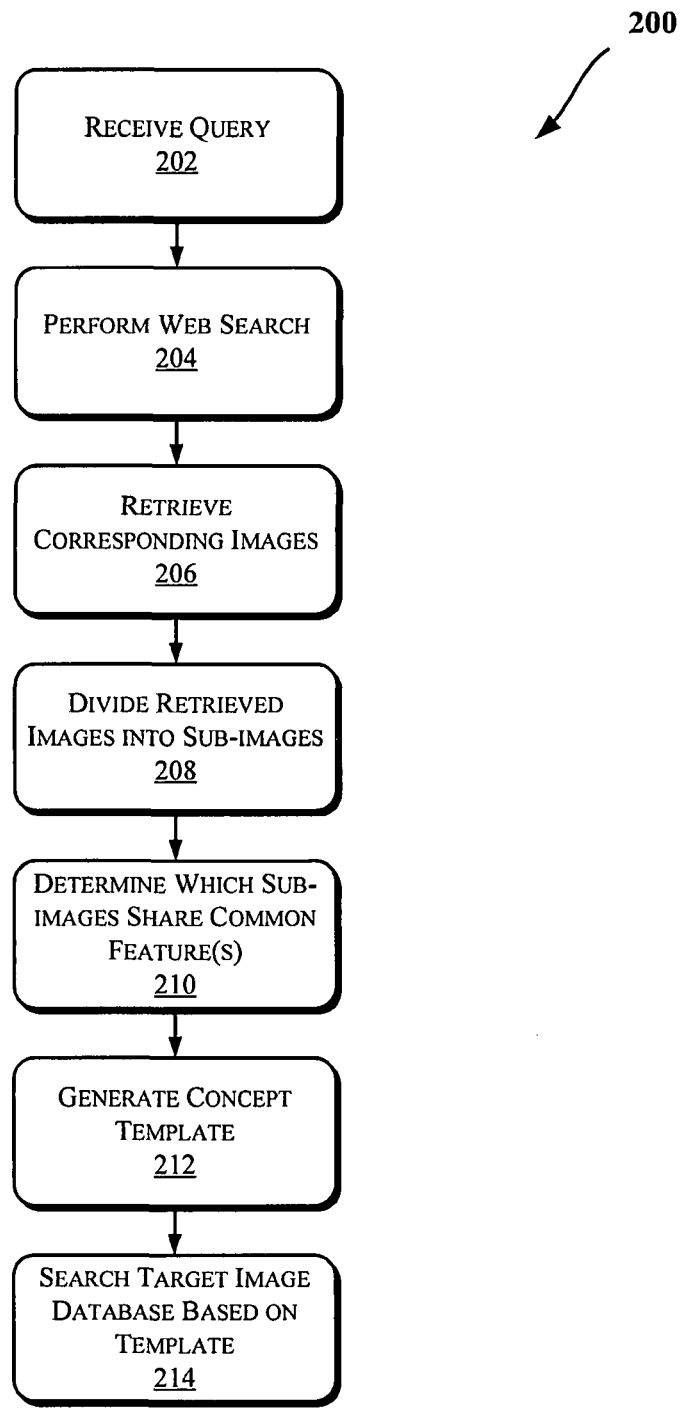

FIG. 2 illustrates a block diagram of an embodiment of a method 200 to search a target image database. In an embodiment, various components discussed herein, e.g., with reference to FIGS. 1 and 2 may be utilized to perform one or more of the operations discussed with reference to FIG. 2. For example, the method 200 may be used to retrieve one or more training images from the Internet through a network connection established through the network interface 303 of FIG. 3. Also, in an embodiment, a portion or the whole target image database may be stored in one or more of the memory 312 and/or the disk drive 328 of FIG. 3. Furthermore, some portion or the whole target image database may be stored on a remote computer, such as a server.

Referring to FIGS. 1-2, at an operation 202, a query may be received (e.g., from a user). At an operation in 204, a Web search may be performed (e.g., such as discussed with reference to FIG. 1). In an embodiment, a search engine may be used to perform operation 204. At an operation 206, one or more images may be retrieved from the Web (e.g., such as a training images 106). In an embodiment, the retrieved images may be resized (e.g., to conform to a standard template size such as 640×480 pixels, for example).

At an operation 208, the retrieved images may be divided into sub-images. For example, the retrieved images may be divided into 16×16 blocks of pixels. Furthermore, in some embodiments, a sliding window may be used to divide the retrieved images. For example, the sliding window may be moved by 50% of the pixels (e.g., 8 pixels in each step for a 16×16 sub-image block) in the vertical and/or horizontal planes to generate a plurality of sub-images that correspond to the retrieved images. Moving the sliding window by 50% may reduce or avoid image boundary issues in some embodiments. In an embodiment, at operation 208, image segmentation techniques may be used, e.g., based on edge directions present in the image.

At an operation 210, it may be determined which sub-images of operation 208 may share one or more common features. For example, the sub-images may be compared with each other to determine whether a certain characteristic (e.g., color histogram, concentration of a pattern, a shape, combinations thereof, etc.) of an item identified by the query at operation 202 (e.g., a stuffed animal) is commonly shared between the sub-images being compared. In some embodiments, a value (e.g., color histogram, concentration of a pattern, a shape, etc.) corresponding to the identified features may be weighed against a threshold value at operation 210, e.g., to decide whether one or more of the sub-images share common feature(s). In an embodiment, the value may be a hash function of various pixel values present in the sub-images (such as color, contrast, etc.). At an operation in 212, one or more concept templates may be generated in accordance with the common features of the sub-images determined at operation 210. At an operation 214, the generated concept template(s) may be used to search a target image database (e.g., by comparing images in the database to the features identified by the templates).

In order to retrieve relevant images from database using the query templates from operation 210, these images may be pre-partitioned into sub-images at various granularities. For example, the same image may be divided into sub-images at various granularities (e.g., 16×16 blocks of pixels, 64×64 blocks of pixels, 256×256 blocks of pixels, etc.). In an embodiment, query templates may be first compared with the sub-images at the coarse granularity (e.g. 256×256 blocks of pixels), at operation 214, e.g., to provide faster searching. Subsequently, if no search results are provided with the coarse granularity sub-images, finer granularity sub-images may be used at operation 214 to perform the search against the query templates.

Figure 3:
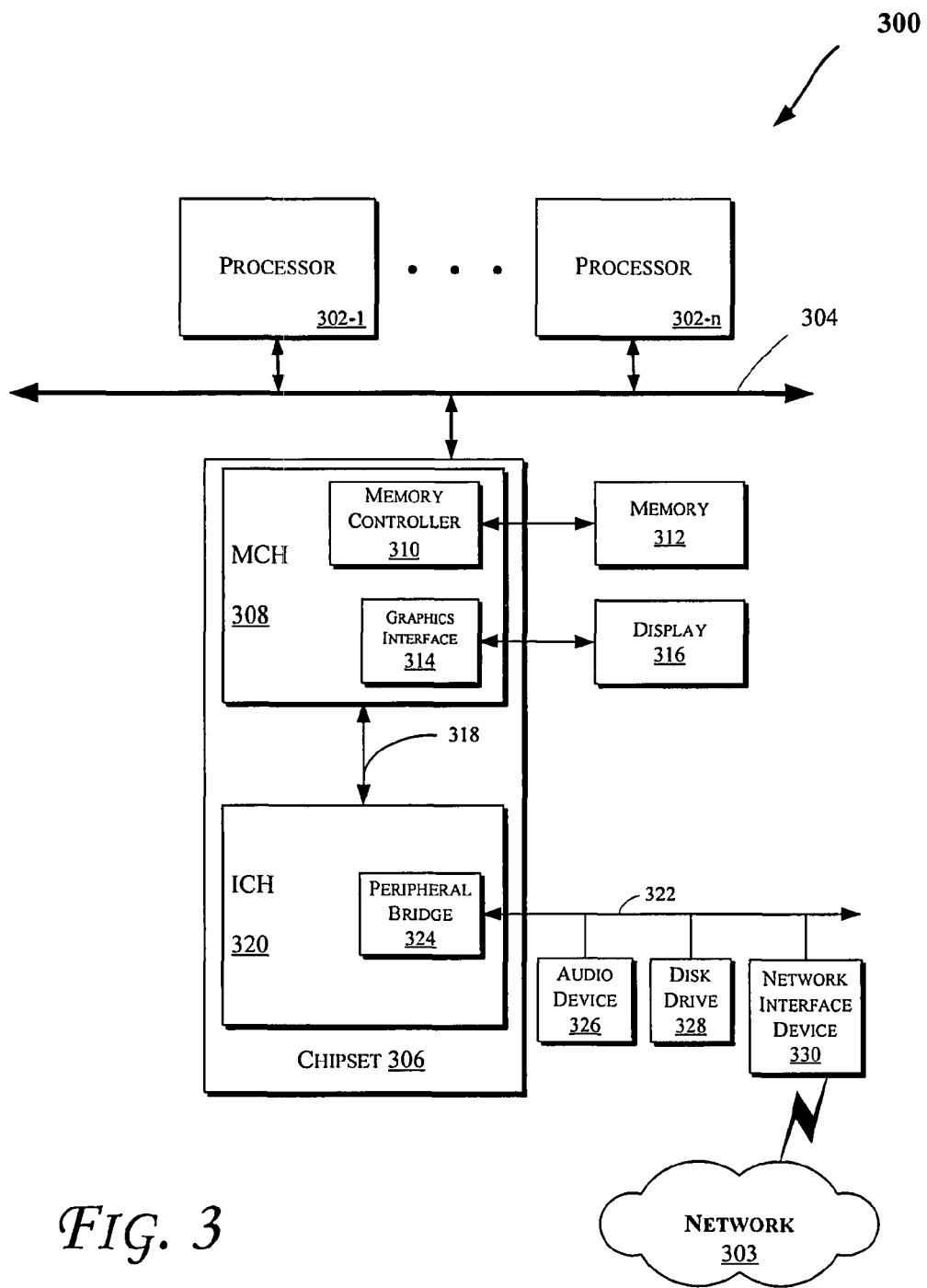
FIG. 3 illustrates a block diagram of an embodiment of a computing system, which may be utilized to implement various embodiments discussed herein.

FIG. 3 illustrates a block diagram of an embodiment of a computing system 300. In various embodiments, one or more of the components of the system 300 may be provided in various electronic devices capable of performing one or more of the operations discussed herein with reference to various embodiments of the invention. For example, one or more of the components of the system 300 may be provided in a personal computer (such as a desktop computer, a laptop computer, a workstation, etc.), a server computer (e.g., a remote server computer), digital media device (such as a Moving Picture Experts Group Layer-3 Audio (MP3) or a Moving Picture Experts Group 4 (MPEG4) device), a set-top box, a personal video recorder (PVR), a personal digital assistant (PDA), a mobile phone (such as a cellular phone or an Internet protocol (IP) phone), etc.

Moreover, the computing system 300 may include one or more central processing unit(s) (CPUs) 302 or processors that communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors. Moreover, the operations discussed with reference to FIGS. 1-2 may be performed by one or more components of the system 300.

A chipset 306 may also communicate with the interconnection network 304. The chipset 306 may include a memory control hub (MCH) 308. The MCH 308 may include a memory controller 310 that communicates with a memory 312. The memory 312 may store data, including sequences of instructions that are executed by the CPU 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The MCH 308 may also include a graphics interface 314 that communicates with a display 316. In one embodiment of the invention, the graphics interface 314 may communicate with the display 316 via an accelerated graphics port (AGP). In an embodiment of the invention, the display 316 may be a flat panel display that communicates with the graphics interface 314 through, for example, a signal converter that translates a digital representation of an image stored in a storage device such as video memory or system memory into display signals that are interpreted and displayed by the display 316. The display signals produced by the interface 314 may pass through various control devices before being interpreted by and subsequently displayed on the display 316.

A hub interface 318 may allow the MCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330, which may be in communication with the computer network 303. In an embodiment, the device 330 may be a NIC capable of wireless communication. In an embodiment, the network 303 may be the same or similar to the networks 102 of FIG. 1 and/or 230 of FIG. 2. In one embodiment, the network interface device 330 may include one or more components of the wireless device 210 of FIG. 2. Also, the device 330 may be the same or similar to the device 210 of FIG. 2 in some embodiments. Other devices may communicate via the bus 322. Also, various components (such as the network interface device 330) may communicate with the MCH 308 in some embodiments of the invention. In addition, the processor 302 and the MCH 308 may be combined to form a single chip. Furthermore, the graphics interface 314 may be included within the MCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 300 may be arranged in a point-to-point (PtP) configuration. For example, processors, memory, and/or input/output devices may be interconnected by a number of point-to-point interfaces.

In various embodiments of the invention, the operations discussed herein, e.g., with reference to FIGS. 1-3, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a storage unit to store one or more images retrieved in response to a query;
logic circuitry to determine whether a plurality of sub-images of the retrieved images share one or more features and generate one or more templates corresponding to the shared features, wherein the plurality of sub-images are to be generated based on edge directions present in the retrieved images;
logic circuitry to determine existence of the one or more features based on concentration of a pattern present in the plurality of sub-images; and
logic circuitry to search an image database based on the one or more templates, wherein the image database is to store the plurality of sub-images of the retrieved images, wherein the stored sub-images include various granularities of the same image.

2. The apparatus of claim 1, further comprising an input/output device to receive input data corresponding to the query.

3. The apparatus of claim 1, further comprising a display device to display one or more results of the search.

4. The apparatus of claim 1, wherein the logic circuitry comprises a processor.

5. The apparatus of claim 4, wherein the processor comprises one or more cores.

6. The apparatus of claim 1, further comprising a network interface to couple the storage unit to the Internet.

7. A non-transitory computer-readable medium comprising one or more instructions that when executed on a processor configure the processor to:
retrieve one or more images in response to a query;
determine whether a plurality of sub-images of the retrieved images share one or more features;
generate one or more templates corresponding to the shared features, wherein the plurality of sub-images are to be generated based on edge directions present in the retrieved images;
determine existence of the one or more features based on concentration of a pattern present in the plurality of sub-images; and
search an image database based on the one or more templates, wherein the image database is to store the plurality of sub-images of the retrieved images, wherein the stored sub-images include various granularities of the same image.

8. The non-transitory computer-readable medium of claim 7, further comprising one or more instructions that configure the processor to perform a search over the Internet based on the query.

9. The non-transitory computer-readable medium of claim 7, further comprising one or more instructions that configure the processor to cause a display device to display one or more results of the search.

10. The non-transitory computer-readable medium of claim 7, further comprising one or more instructions that configure the processor to divide the retrieved images into the plurality of sub-images.

11. The non-transitory computer-readable medium of claim 7, further comprising one or more instructions that configure the processor to determine which of the plurality of sub-images share the one or more features.

12. The non-transitory computer-readable medium of claim 7, further comprising one or more instructions that configure the processor to generate the plurality of sub-images based on edge directions present in the retrieved images and by applying a sliding window to the retrieved images.

13. The non-transitory computer-readable medium of claim 7, further comprising one or more instructions that configure the processor to determine an existence of the one or more features based on one or more of a color, the concentration of the pattern, the shape, or combinations thereof that are present in the plurality of sub-images.

14. The apparatus of claim 1, wherein a value, corresponding to the determined one or more features, is to be compared against a threshold value to determine whether one or more of the plurality of sub-images share the one or more features.

15. The apparatus of claim 14, wherein the value is to comprise a hash function of various pixel values present in the plurality of sub-images.

16. The non-transitory computer-readable medium of claim 7, further comprising one or more instructions that configure the processor to compare a value, corresponding to the determined one or more features, against a threshold value to determine whether one or more of the plurality of sub-images share the one or more features.

17. The non-transitory computer-readable medium of claim 16, wherein the value is to comprise a hash function of various pixel values present in the plurality of sub-images.

18. The apparatus of claim 1, wherein the plurality of sub-images are to be instead generated by dividing the retrieved images into a same size of pixel blocks.

19. The non-transitory computer-readable medium of claim 7, wherein the plurality of sub-images are to be generated based on edge directions present in the retrieved images and by dividing the retrieved images into a same size of pixel blocks.

20. The apparatus of claim 1, wherein the plurality of sub-images are to be generated by based on edge directions present in the retrieved images and applying a sliding window to the retrieved images.

21. The apparatus of claim 1, wherein the logic circuitry to determine the existence of the one or more features is to operate based on the concentration of the pattern present in the plurality of sub-images in combination with one or more of a color, a shape, or combinations thereof that are present in the plurality of sub-images.

22. The apparatus of claim 1, further comprising logic circuitry to perform a first search of the image database at a coarse granularity, wherein the image database is to store sub-images with various granularities of the same image, wherein logic circuitry is to perform a second search of the image database at a finer granularity than the first search in response to lack of a search result for the first search.

* * * * *